July 26, 1955  F. C. KELTON  2,713,789
PERMEAMETER
Filed Oct. 16, 1951  2 Sheets-Sheet 1
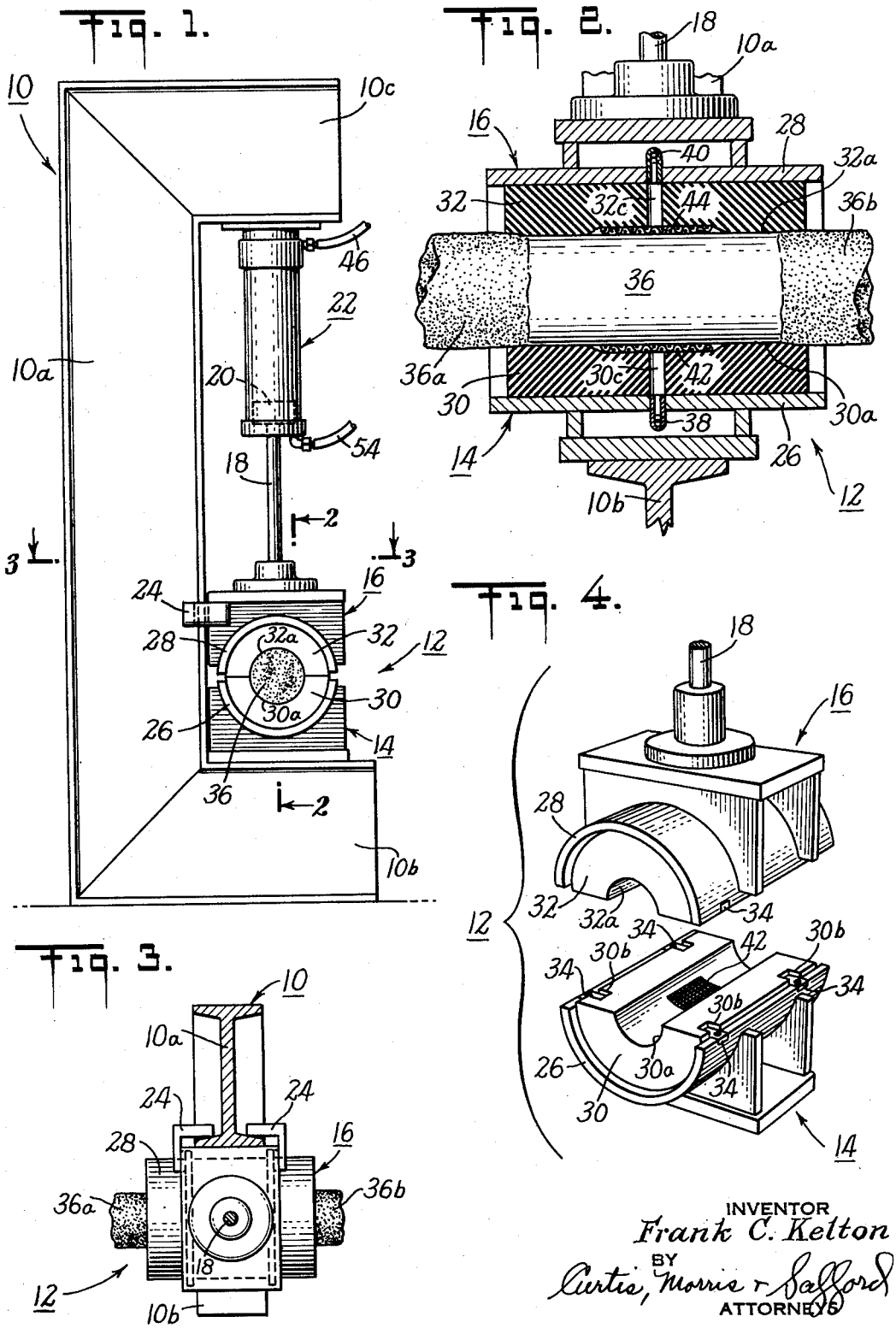
INVENTOR
Frank C. Kelton
BY
Curtis, Morris & Safford
ATTORNEYS July 26, 1955 F. C. KELTON 2,713,789
PERMEAMETER
Filed Oct. 16, 1951 2 Sheets-Sheet 2

INVENTOR
Frank C. Kelton
BY
Curtis, Morris & Safford
ATTORNEYS

United States Patent Office 2,713,789
Patented July 26, 1955

2,713,789

PERMEAMETER

Frank C. Kelton, Dallas, Tex., assignor to Core Laboratories Inc., Dallas, Tex., a corporation of Texas Application October 16, 1951, Serial No. 251,561

4 Claims. (Cl. 73—38)

This invention relates to apparatus for measuring the permeability of porous media, particularly oil sand core samples.

In the drilling of oil wells, it is customary to ascertain the nature of probable oil or gas productivity of the formations traversed by the bore hole by taking core samples of such formations and analyzing these samples for such characteristics as their porosity, permeability, and oil and gas saturation. Since the information thus obtained is frequently used to determine whether drilling is to be continued or whether the well is to be set for production at the horizon from which the core sample is taken, it is usually important that the various analyses of the core sample be made rapidly. It is therefore one of the objects of the present invention to provide apparatus by which the permeability of core samples can be measured accurately and with rapidity.

It is usually desirable to perform the analysis upon a core sample of relatively large size so that the sample is truly representative of the average characteristics of the formation from which it is taken. The use of a relatively large sample is especially important if the formation from which the core sample is taken is fractured or vugular. It is accordingly another object of the present invention to provide apparatus capable of accurately measuring the permeability of core samples of considerable length and of full cross-sectional size.

In the apparatus heretofore commonly used for measuring permeability of oil sand core samples, a fluid, either liquid or gas, has been forced through a specimen of the core material, the specimen being contained in a chamber which snugly enclosed the specimen laterally so that the fluid was forced to flow through rather than around the specimen, and measuring the rate of flow of the fluid at a given pressure. This arrangement has necessitated cutting from the core sample a specimen very accurately sized so as to conform precisely to the internal dimensions of the chamber. The steps of cutting and shaping the specimen to such accurate dimensions consumed considerable time, thereby delaying the analysis and considerably adding to its cost. It is thus a further object of the present invention to provide apparatus which obviates the necessity of accurately sizing the specimen and permits the measurement of the permeability of cylindrical core sections just as they are taken from the well.

Other objects will be in part apparent and part pointed out hereinafter. In the drawings in which an illustrative embodiment of the invention is shown, Figure 1 is a side-view of a major portion of the apparatus;

Figure 2 is a fragmentary vertical section taken generally along the line 2—2 of Figure 1;

Figure 3 is a horizontal section taken along the line 3—3 of Figure 1;

Figure 4 is a fragmentary perspective view of the apparatus of Figure 1, showing the jaws in open position;

Figure 5:
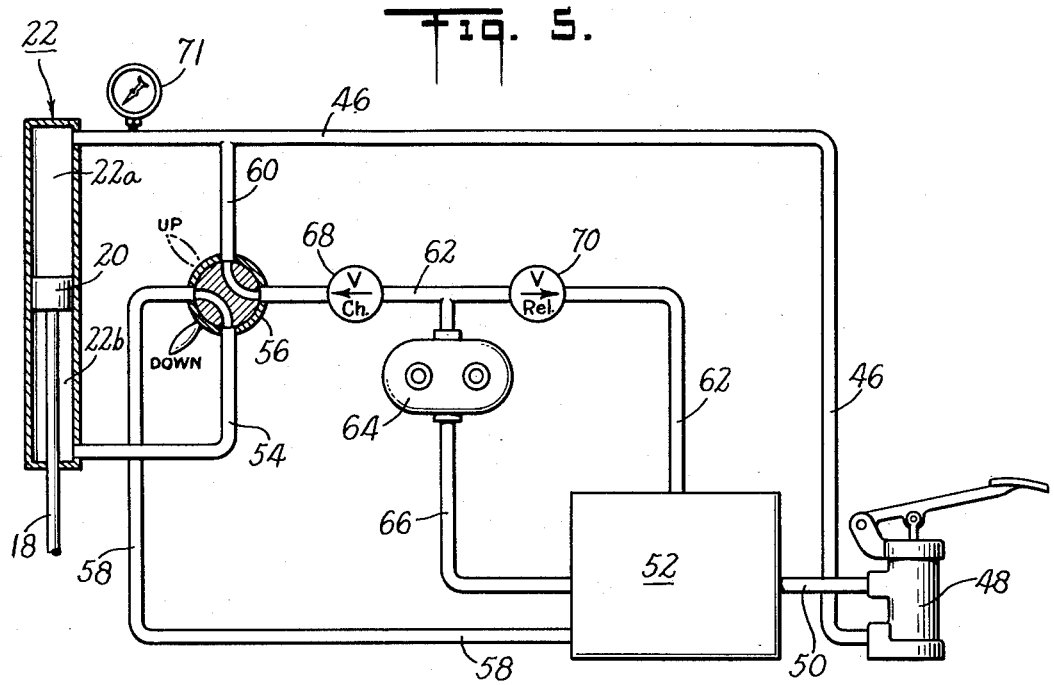
Figure 5 is a schematic diagram of the hydraulic system of the apparatus.

The apparatus of the present invention comprises generally a vise assembly with a pair of clamping jaws having resilient faces adapted to enclose a longitudinal section of an oil sand core sample and an hydraulic ram for exerting on the jaws a substantial compressive force to cause the resilient jaw faces to enclose the core very tightly and prevent the escape of gas through the sides of the section of the core sample within the jaw faces. The core sample may be previously prepared by dipping its ends in a sealing material to prevent escape of gas from the ends of the core sample outside of the jaw faces. Openings in the resilient jaws are provided in communication with a pneumatic circulator system for passing a current of air or other gas through the sample and measuring its rate of flow as an indication of the permeability of the sample.

The press portion of the apparatus is shown in Figures 1 through 4. As may be seen in Figure 1, the frame 10 of the press assembly is generally C-shaped; it is formed of I-section beams and includes an upright portion 10a, a lower or table portion 10b, rigidly secured to the lower end of the upright portion 10a and extending at right angles therefrom, and a similar upper horizontal or overarm portion 10c extending from the upper end of the vertical portion 10a opposite the lower portion 10b.

The jaw assembly, generally indicated 12, includes a fixed lower jaw 14 which is secured on the table portion 10b of the frame and movable upper jaw 16 which is secured at the lower end of the piston rod 18 of a piston 20 within a hydraulic cylinder 22, the upper end of which is secured to the overarm portion 10c of the frame. Movement of the piston 20 within hydraulic cylinder 22 thus serves to actuate the movable jaw 16 to move it toward or away from the fixed jaw 14. The movable jaw 16 is guided in its vertical movements by L-shaped brackets 24 which engage the adjacent flanges of the upright portion 10a of the frame, as shown in Figure 3.

As best seen in Figure 4, each of the jaws 14 and 16 includes a generally semi-cylindrical metal cradle 26 and 28, respectively. These cradles, 26 and 28, are lined with thick face members, 30 and 32, respectively, of rubber or similar resilient material.

The face members 30 and 32 are hollowed out to form semi-cylindrical recesses 30a and 32a, respectively so dimensioned as to admit between the two jaws a cylindrical core sample 36, such as is formed by one of the conventional sizes of core bits. These face members 30 and 32 are removably secured in the cradles 26 and 28 by lugs 34 which are screwed to the edges of the cradles and project into recesses such as 30b (Figure 4) in the adjacent corners of the face members.

The hydraulic cylinder 22 develops a very substantial compressive force on the jaws 14 and 16, which causes the face members 30 and 32 to squeeze the cylindrical core sample between them very tightly and prevent the escape of gas from the portion of the core sample within jaws. The resilient nature of the face members 30 and 32 causes them to conform to surface irregularities in the core sample and effect the desired gas-tight seal.

As may be sen in Figure 2, the core sample 36, prior to being placed between the jaws 14 and 16 is prepared by dipping its end portions 36a and 36b into a sealing compound, preferably a strippable compound, such as the strippable plastic material which is available commercially under the trade name "Seal-Peel." This prevents escape of gas or other fluid from the ends of the core which project beyond the face members 30 and 32, during the analysis, yet permits the sealing material to be stripped away from the core sample following the analysis so that the core sample may subsequently be used for other analyses.

Each of the face members 30 and 32 is provided with a central vertical opening 30c and 32c respectively (Figure 2). Conduits 38 and 40 communicate with these openings 30c and 32c and carry a current of gas under pressure through the core sample.

In order to increase the area of the core sample in communication with the openings 30c and 32c, as is often desirable, particularly with samples of low permeability, pieces of coarse wire screen 42 and 44 (Figures 2 and 4) may be used between the face members 32 and the core sample 36 at the openings 30c and 32c. Since the wire screen holds the face members out of contact with the core sample in the area of the screen, and since the screen material is permeable to gas or other fluid in directions both perpendicular to and parallel to the plane of the screen, the openings 30c and 32c will be in communication with the core sample 36 throughout the area of the respective screens 42 and 44. The screens are suitably of such size that each extends around 90 degrees of the circumference of the core sample. The area of the screens may be varied as is convenient, for example in accordance with the permeability of the sample, so long as the area is known, since the area of the screens is a factor in computing permeability.

Figure 5 is a schematic diagram illustrating the hydraulic circuit for actuation of the movable jaw assembly 16 of the apparatus. As may be seen in that figure, the upper portion 22a of the hydraulic cylinder 22 above the piston 20 is connected through a conduit 46 with a low-volume, high-pressure, foot-actuated pump 48 which receives hydraulic fluid through a conduit 50 from a sump 52. The upper end 22a of the cylinder 22 is also connected through a conduit 60, a reversing valve 56 (when the valve is in the "down" position, as shown in Figure 5) and a conduit 62 with a high-volume, low-pressure, motor-driven pump 64 which receives hydraulic fluid through a conduit 66 from the sump 52. A check valve 68 is interposed in the conduit 62 between the low-pressure pump 64 and the high-pressure pump 48 to prevent the high-pressure pump from discharging through the low-pressure pump 64. A relief valve 70 is also provided in the conduit 62 to limit the pressure in the conduit 62 developed by the pump 64. The lower end 22b of the cylinder 22 below the piston 20 is connected through a conduit 54, a reversing valve 56 (when the reversing valve is in the "down" position) and a conduit 58 with the sump 52.

It will be understood that when the reversing valve 56 is turned to the "down" position, as shown, the motor-driven pump 64 will supply hydraulic fluid at a high rate and low pressure to the upper end 22a of cylinder 22, through conduit 62, valve 56 and conduit 60, while the fluid in the lower end 22b of cylinder 22 is exhausted through conduit 54, valve 56 and conduit 58 to the sump 52. This will result in rapidly lowering the upper jaw assembly 16 into engagement with the lower jaw assembly 14. The pressure thus developed between the two jaws is, however, limited by the check valve 70. After the jaws have thus been brought into engagement, the operator then actuates the pedal pump 48 to supply hydraulic fluid at high pressure through the conduit 46 to the upper end 22a of cylinder 22 and produce the desired high pressure between the jaws to squeeze the core sample tightly between the face members 30 and 32. A pressure gauge 71 in the conduit 46 serves to indicate to the operator the degree of hydraulic pressure thus developed.

In order to separate the jaws, the operator turns the reversing valve 56 ninety degrees counterclockwise to the "up" position, at which the lower end 22b of the cylinder 22 is connected through conduit 54, valve 56 and conduit 62 to the low pressure pump 64 and the upper end of the cylinder 22 above the piston 20 is connected through conduit 60, valve 56 and conduit 58 with the sump 52. This results in rapid upward movement of the piston 20 and of the attached upper jaw assembly 16 to separate the jaws and allow removal of the core sample 36.

Figure 6:
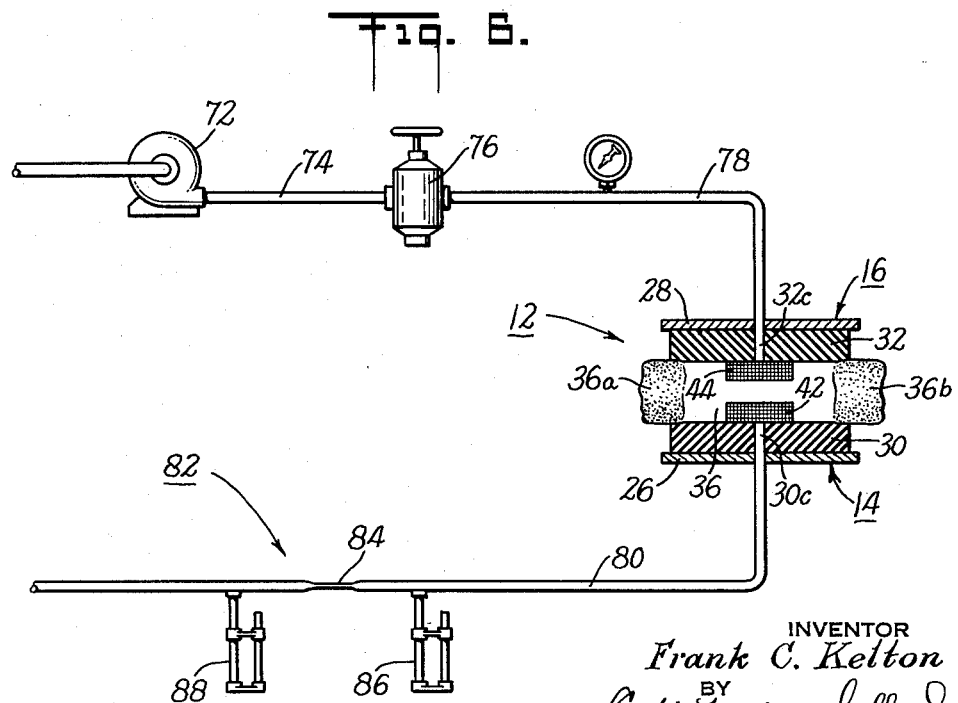
Figure 6 is a schematic diagram of the pneumatic system of the apparatus.

Figure 6 is a schematic diagram of the pneumatic system of the apparatus. A pump 72 supplies air or other gas under pressure through a conduit 74 to a pressure reducing valve 76, which reduces the pressure developed by the pump 72 to a predetermined constant pressure, and through a supply conduit 78 to the opening 32c in the upper jaw assembly 16. The opening 30c in the lower jaw assembly is connected through a vent conduit 80 to a rate-of-flow measuring instrument 82, in this case schematically indicated as an orifice 84 with manometers 86 and 88 at the upsteam and downsteam sides thereof. From thence, the gas, if air, is exhausted to atmosphere, or, if a gas other than air is used, may be recirculated.

As will be understood, this circuit provides a flow of gas under a known and constant pressure in series with the core sample under analysis, and the rate-of-flow measuring instrument 82 measures the rate of flow, from which the permeability of the sample may be calculated by D'Arcy's formula. This formula may be simply stated as $$K = \frac{QL}{AP}$$

wherein K is the permeability; Q is the rate of flow of fluid; L is the length of the mean fluid path; A is the means area of the fluid path; and P is the pressure drop through the sample. In the use of the present apparatus, the area A is approximately equal to the area of the screens 42 and 44, and the length L is approximately equal to the mean spacing of the screens, that is the mean chord of the core sample 36 between the screens; more precise values for A and L can be determined empirically.

It will be apparent that a length of oil sand core may, without careful cutting or other lengthy preparation, be placed directly in the apparatus and its permeability measured with rapidity. It will therefore be appreciated that the aforementioned and other desirable objects have been achieved. However, it should be emphasized that the particular apparatus shown and described is intended as merely illustrative and not as restrictive of the invention.

For example, instead of circulating air or other gas for the permeability measurement, a liquid such as water or oil may be employed, substituting for the gas moving and measuring equipment shown in Figure 6 apparatus suitable to the fluid employed. Likewise the use of the sealing compound on the ends of the core sample which project beyond the face members may be dispensed with, particularly where the length of the screens 42 and 44 are short as compared to the length of the core sample within the face members, so that the loss of fluid through the ends of the core sample is negligible; or if greater accuracy is desired, a correction factor to compensate for the fluid so lost may be empirically determined. Other variations in the specific apparatus and method illustrated and described will be obvious to those familiar with the art.

I claim as my invention:

1. Apparatus for measuring the permeability of cylindrical oil sand core samples which comprises a vise assembly having a pair of oppositely disposed jaws and means for applying substantial clamping pressure to said jaws, a pair of resilient face members each mounted on one of said jaws and having oppositely disposed generally semi-cylindrical recesses with generally diametrically opposed openings therein, whereby said core samples may be received between said face members and substantial clamping pressure applied thereto to substantially seal a longitudinal section of said core sample against the escape of gas therefrom, a supply conduit adapted to connect one of said openings with a source of gas under pressure, a vent conduit in communication with the other of said openings, whereby to permit the passage of gas through said core sample at a rate of flow depending upon the permeability of said core sample, and a flow meter connected with at least one of said conduits for measuring the rate of flow of gas through said conduit as a measure of the permeability of said sample.

2. Apparatus for measuring the permeability of generally cylindrical oil sand core samples which comprises a vise assembly including a frame and a pair of oppositely disposed jaws at least one of which is movable relative to said frame and to the other jaw, an hydraulic cylinder and piston interposed between said frame and said movable jaw and means to supply hydraulic fluid under pressure to said hydraulic cylinder whereby to cause said cylinder and piston to exert between said frame and said movable jaw a substantial pressure tending to close said jaws, a pair of resilient face members each mounted on one of said jaws and having opposed generally semi-cylindrical recesses with generally diametrically opposed openings therein, whereby said core samples may be received between said face members and substantial clamping pressure applied thereto to substantially seal a longitudinal section of said core sample against the escape of gas therefrom, a supply conduit adapted to connect one of said openings with a source of gas under pressure, a vent conduit in communication with the other of said openings, whereby to permit the passage of gas through said core sample at a rate of flow depending upon the permeability of said core sample, and a flow meter connected with at least one of said conduits for measuring the rate of flow of gas through said conduit and through said core sample as a measure of the permeability of said sample.

3. Apparatus for measuring the permeability of generally cylindrical oil sand core samples which comprises a vise assembly having a pair of oppositely disposed jaws and means for applying substantial clamping pressure to said jaws, a pair of resilient face members each mounted on one of said jaws and having opposed generally semi-cylindrical recesses with generally diametrically opposed openings therein, whereby said core samples may be received between said face members and substantial clamping pressure applied thereto to substantially seal a longitudinal section of said core sample against the escape of gas therefrom, a supply conduit adapted to connect one of said openings with a source of gas under pressure, a vent conduit in communication with the other of said openings, whereby to permit the passage of gas through said core sample at a rate of flow depending upon the permeability of said core sample, two relatively thin and flexible sheet-like members highly permeable to the flow of gas in directions both perpendicular to and parallel to the plane of the sheet, each of said sheet-like members being adapted to be interposed between one of said face members and said core sample in the region of said opening whereby to increase the surface area of said core in communication with said openings, and a flow meter connected with at least one of said conduits for measuring the rate of flow of gas through said conduit and through said core sample as a measure of the permeability of said sample.

4. Apparatus for measuring the permeability of generally cylindrical oil sand core samples which comprises a vise assembly having a pair of oppositely disposed jaws and means for applying substantial clamping pressure to said jaws, a pair of resilient face members each mounted on one of said jaws and having opposed generally semi-cylindrical recesses with generally diametrically opposed openings therein, whereby said core samples may be received between said face members and substantial clamping pressure applied thereto to substantially seal a longitudinal section of said core sample against the escape of gas therefrom, a supply conduit adapted to connect one of said openings with a source of gas under pressure, a vent conduit in communication with the other of said openings, whereby to permit the passage of gas through said core sample at a rate of flow depending upon the permeability of said core sample, two pieces of wire screen, each adapted to be interposed between one of said face members and said core sample in the region of said opening whereby to increase the surface area of said core in communication with said openings, and a flow meter connected with at least one of said conduits for measuring the rate of flow of gas through said conduit and through said core sample as a measure of the permeability of said sample.

References Cited in the file of this patent

UNITED STATES PATENTS

| | | |
|---|---|---|
| 982,773 | Wood | Jan. 24, 1911 |
| 1,368,147 | Hennebohle | Feb. 8, 1921 |
| 1,571,958 | Mueller et al. | Feb. 9, 1926 |
| 2,539,355 | Reichertz | Jan. 23, 1951 |
| 2,633,739 | Potts et al. | Apr. 7, 1953 |
| 2,348,985 | Lewis | May 16, 1944 |
| 2,498,198 | Beeson | Feb. 21, 1950 |
| 2,635,454 | Ford | Apr. 21, 1953 |